United States Patent [19]

Goldben et al.

[11] Patent Number: 5,673,556

[45] Date of Patent: *Oct. 7, 1997

[54] DISPROPORTIONATION RESISTANT METAL HYDRIDE ALLOYS FOR USE AT HIGH TEMPERATURES IN CATALYTIC CONVERTERS

[75] Inventors: P. Mark Goldben, Florida, N.Y.; Gary D. Sandrock, Ringwood, N.J.

[73] Assignee: Ergenics, Inc., Ringwood, N.J.

[*] Notice: The term of this patent shall not extend beyond the expiration date of Pat. No. 5,480,721.

[21] Appl. No.: 369,750

[22] Filed: Jan. 6, 1995

Related U.S. Application Data

[63] Continuation-in-part of Ser. No. 925,551, Aug. 4, 1992, Pat. No. 5,450,721.

[51] Int. Cl.[6] ............................................. F01N 3/10
[52] U.S. Cl. ................................... 60/284; 420/900
[58] Field of Search ......................... 420/900; 423/644; 429/218, 221, 223; 60/284, 274, 300, 303, 320; 62/462

[56] References Cited

U.S. PATENT DOCUMENTS

| Re. 34,588 | 4/1994 | Hong . | |
|---|---|---|---|
| 4,302,436 | 11/1981 | Sirovich et al. . | |
| 4,440,736 | 4/1984 | Maeland et al. | 420/900 |
| 4,783,329 | 11/1988 | Maeland et al. . | |
| 4,832,913 | 5/1989 | Hong et al. . | |
| 5,006,328 | 4/1991 | Hong . | |
| 5,277,998 | 1/1994 | Furukawa et al. | 420/900 |
| 5,290,509 | 3/1994 | Furukawa et al. | 420/900 |
| 5,450,721 | 9/1995 | Goldben et al. | 60/274 |

FOREIGN PATENT DOCUMENTS

| 3033503 | 3/1981 | Germany | 420/900 |
|---|---|---|---|
| 53-092317 | 8/1978 | Japan | 420/900 |
| 54-068702 | 6/1979 | Japan | 420/900 |
| 56-041339 | 4/1981 | Japan | 420/900 |
| 60-251238 | 12/1985 | Japan | 420/900 |
| 5-213601 | 8/1993 | Japan . | |
| 5-291017 | 11/1993 | Japan | 420/900 |
| 7-207493 | 8/1995 | Japan . | |
| 7-211344 | 8/1995 | Japan . | |

OTHER PUBLICATIONS

ASM Handbook, vol. 2 p. 731 1990.

I.E. Nemirovskaya, A. M. Alekseevand V.V. Lunin J of Alloys and Compounds, 177 (1991) 1–15.

R. Griessen, A. Driessen and DG. DeGroot. J of the Less Common Metals 103 (1984) 235–244.

K.H.J. Buschow and A.M. van Diepen, Solid State Communications vol. 31, pp. 469–471 Aug. 1977.

Journal of the Less–Common Metals, 89 (1983) 333–340 "A Technique for Analyzing Reversible Metal Hydride System Performance" P. M. Golben and E. Lee Huston.

*Primary Examiner*—James Engel
*Assistant Examiner*—Margery S. Phipps
*Attorney, Agent, or Firm*—Dorn, McEachran Jambor & Keating; Vangelis Economou

[57] ABSTRACT

Metal hydrides for absorbing hydrogen which are capable of undergoing repeated charge/discharge cycles of absorbing and desorbing hydrogen at high temperatures and cycles through a high temperature followed by a low temperature. These alloys are intended for use in devices such as heat pumps, heat exchangers, energy storage devices, thermal actuators, temperature sensors and electrochemical cells. The alloys generally comprise the chemical formula $$A_{1-x}B_x$$

where

A is selected from the group of elements consisting of Ti, Hf, Y,

B is selected from the group of elements consisting of Nb, Ni, Co, and Fe, and x is in a range from 0.05 to approximately 0.80, and specific alloys comprise hafnium-nickel (HfNi), hafnium cobalt (HfCo), hafnium-iron ($Hf_2Fe$), yttrium-nickel (YNi) and titanium-niobium $Ti_{1-x}Nb_x$, where x is in a range of from $0.05 < x < 0.60$. Optionally, additives such as Al, B, Co, Cr, Cu, Hf, Mn, Mo, Ni, Fe, Ga, Ge, Si, Sn, Ta, V and Zr may be added in proportions up to about 10 atomic percent relative to the base alloy set forth above to provide for specific customized applications. Also, methods of use for such high temperature disproportionation resistant alloys where the temperature is cycled through an elevated and a lower, sometimes room, temperature are disclosed.

5 Claims, 3 Drawing Sheets

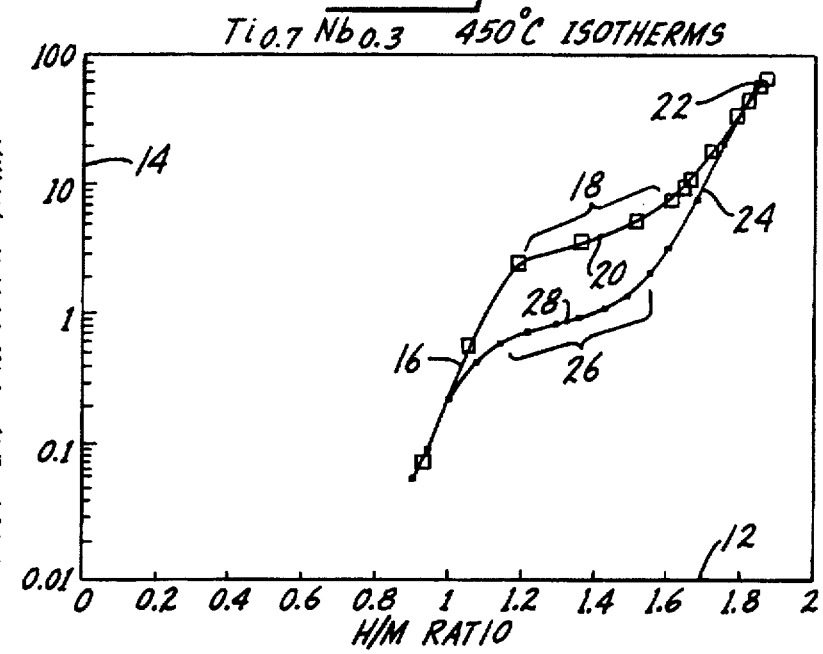
Fig.1. $Ti_{0.7}Nb_{0.3}$ 450°C ISOTHERMS
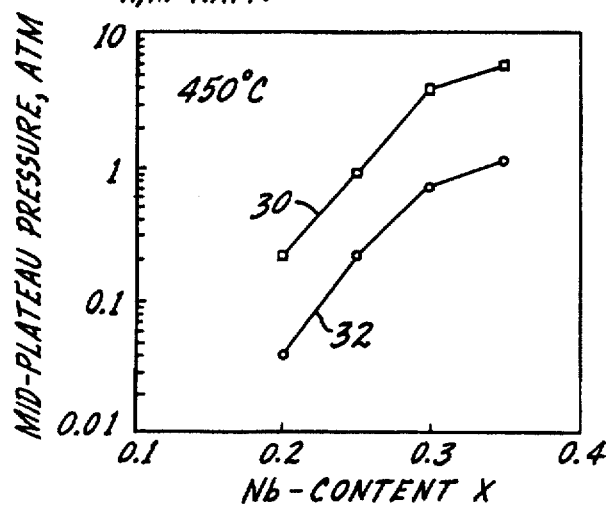
Fig.2. $Ti_{1-x}Nb_x$
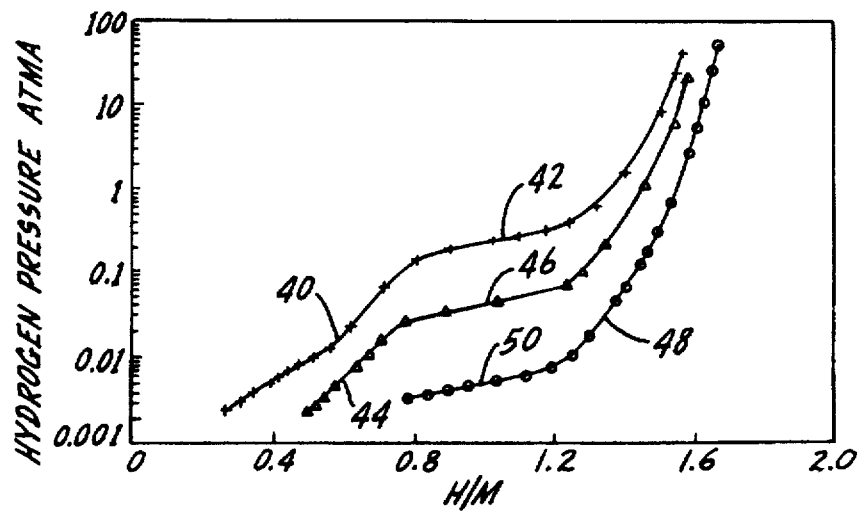
Fig.3. $Ti_{0.8}Nb_{0.2}$ DES ISO

450°C DESORPTION ISOTHERMS $Ti_{0.8}V_{0.2}$  450°C DES. ISOTHERMS

Ti-Nb PHASE DIAGRAM

HfNi 200°C DES. ISOTHERMS

DISPROPORTIONATION RESISTANT METAL HYDRIDE ALLOYS FOR USE AT HIGH TEMPERATURES IN CATALYTIC CONVERTERS

RELATED APPLICATIONS

This application is a continuation-in-part of U.S. patent application Ser. No. 07/925,551, filed Aug. 4, 1992, now U.S. Pat. No. 5,450,721.

BACKGROUND OF THE INVENTION

1. Field of the Invention

This invention relates generally to metal hydrides for absorbing hydrogen and more particularly, to metal hydrides which are capable of undergoing repeated charge/discharge cycles of absorbing and desorbing hydrogen at high temperatures for use in devices such as heat pumps, heat exchangers, energy storage devices and electrochemical cells.

2. Background Art

Metal hydrides are elements and alloys or intermetallic compounds of elements that are capable of reversibly absorbing hydrogen. As used herein, the terms metal hydride and metal hydride alloy refer to both metal alloys in an unhydrided state, sometimes referred to as metal hydriding alloys, and also to metal alloys in a hydrided state, which include the metal alloys with hydrogen. These metal hydride alloys may take shape as solid solution alloys or as intermetallic compounds. The hydrogen is incorporated within a matrix of metal atoms for storage in solid conditions. The matrix may comprise a lattice of a metal crystal structure, and the hydrogen atoms become interspersed between the metal atoms.

Metal hydride alloys are particularly useful in electrochemical cells, heat exchangers, heat pumps or heat storage devices, and temperature sensors in which quick exchange of heat or quick production of heat is necessary at specific locations and in energy storage devices which can be charged and discharged as the need and opportunity arises. Other applications are discussed in *Topics in Applied Physics*, Vol. 67, entitled "Hydrogen in Intermetallic Compounds II, Surface and Dynamic Properties, Applications", edited by L. Schlapbach, Springer Verlag, Berlin, Chapter 5, "Applications", G. D. Sandrock et al, 1992, pp. 197–258.

Many applications of the metal hydrides require the metal hydride characteristics and properties to be customized to specified standards or capabilities. For example, different metal hydride alloys and intermetallic compounds are known to have different plateau pressures. At a given alloy composition, temperature variations result in variations in plateau pressure. The variation in characteristics may be utilized to customize to the specific design of each application depending on the desired capabilities.

Metal hydride alloys, whether in the form of solid solution alloys or intermetallic compounds, will reversibly hydride. Whereas alloys may take the formula $A_{1-x}B_x$ having any value of x, intermetallic compounds are limited to certain whole number proportions such as AB or $AB_5$. Whole number proportions result because intermetallic compounds take crystalline forms with specific lattice structures and interstitial spacings between the atoms. In contradistinction, metal hydride alloys can of the solid solution type take one form of crystal lattice structure over a wide composition range. However, changes in the crystal structure may result at specific hydrogen content within the metal alloy during a hydrogen absorption-desorption cycle.

The plateau pressures and the slope of the plateau depend in large part on the composition of the metal hydride alloys and on the metallurgical condition of those alloys. An increase in temperature of an alloy is known to raise the plateau pressure of an alloy and may cause a "hydrogen saturated" alloy to desorb hydrogen gas.

It is therefore possible to provide one alloy having a low plateau pressure and a second alloy which has a higher plateau pressure, and thereby transfer thermal energy from one alloy to the other. If the two alloys are enclosed in chambers connected by a gas conduit, hydrogen will be desorbed by the high pressure alloy and will be simultaneously absorbed by the other alloy with a concomitant release of thermal energy at the low pressure alloy. Such a system is described by Hong et al., U.S. Pat. No. 4,832,913. Hydrogen absorption is an exothermic reaction, and this provides the basic foundation for transfer of thermal energy in a hydride heat pump.

For example, an inventive heat storage and transfer assembly for use in an exhaust gas preheating system is described in aforementioned U.S. Pat. No. 5,450,721. The inventive heat storage assembly requires two different metal hydride alloys, one being capable of forming a low pressure metal hydride and another being capable of forming a high pressure metal hydride disposed at opposite locations within the sealed enclosure defining the heat storage assembly. Opening of a valve between these locations allows for hydrogen flow from the location containing the high pressure metal hydride to the other location containing the previously dehydrided low pressure alloy thus producing spontaneous heating at one region and cooling in another region of the coupled system. The low pressure metal hydride absorbs hydrogen suddenly, preferably in less than thirty seconds and most preferably in less than three seconds. As a result of the sudden absorption of hydrogen, the low pressure alloy undergoes a sudden warming, up to temperatures in excess of 150° C., and even to temperatures exceeding about 450° C. At the same time, the sudden desorption of hydrogen from the high pressure hydride results in an immediate drop in temperature as heat is absorbed by the hydride alloy as hydrogen desorbs from it, which is an endothermic process.

Other applications of metal hydride elements and alloys produce different characteristics and may be useful for other uses. For example, U.S. Pat. No. 4,832,913 issued to Hong et al. describes the use of materials for hydrogen storage and heat pump applications. The majority of presently known metal hydride alloys used for hydrogen storage and other applications operate at or near room temperature. That is, hydrogen is stored and is absorbed and desorbed from the metal hydride at or close to room temperatures. Seldom are the alloys intended to reach temperatures in excess of 100° C.

For use in heat pumps, however, and especially for use in heat pumps where heat is required at high temperatures on an instantaneous basis, the metal hydride alloys are required to undergo tremendous increases and decreases in temperature during hydrogen absorption/desorption cycling. In the above-described heat storage application, temperatures in excess of 500° C. and up to 700° C. are not uncommon in these conditions. In a catalytic converter application, the temperature must be brought up to about 400° C. almost instantaneously to enable preheating of the catalytic converter well before the engine is warmed up.

The related parent patent describes a system using two separated chambers each containing a metal hydride having a low and a high plateau pressure, respectively. Opening a valve between the chambers heats up the low pressure metal hydride alloy which in turn pre-heats the catalytic converter. The disclosure of the subject matter of U.S. Pat. No. 5,450,721 is incorporated herein by reference.

In heat storage, heat pump, temperature sensor and thermal compressor applications, a complete cycle of hydrogen absorption and desorption in each alloy is traversed a great number of times during the lifetime of the respective device. For example, in the catalytic converter preheating system of aforementioned U.S. Pat. No. 5,450,721, a car engine may be started an average of three times daily, for a total life use in excess of about 10,000 times. During each such cycle, the temperature of the low pressure metal hydride cycles rapidly between about room temperature to much higher temperatures. Repeated charge/discharge cycling especially at the high temperatures, has been known to cause changes to the metal hydride crystalline lattice structure.

Often, repeated cycling causes a dissociation of a metal hydride alloy into the constituent elements and/or hydrides of the constituent elements. This process is referred to as disproportionation. Cycling at high temperatures can make a metal hydride alloy especially susceptible to disproportionation to the extreme point where it is no longer able to reversibly store, absorb or desorb hydrogen. Under certain conditions and for a small group of known metal hydride alloys, the irreversible disproportionation reaction occurs in the course of a single cycle. In those cases where a majority of a metal hydride alloy has disproportionated, the only known method of recharging the disproportionated alloy includes a long involved process of heating the alloy under highly controlled vacuum conditions to remove all of the entrained hydrogen and to essentially reform the metal hydride alloy. Such reproportionating of a depleted alloy is described in Sirovich, U.S. Pat. No. 4,302,436, but this process is impractical in most everyday applications.

Disproportionation can generally be considered as an undesirable, and not easily reversible, reaction which causes the metal hydride to become unavailable for the more desirable, and reversible, metal hydride reaction. If an alloy or intermetallic compound with the atomic ratio of elements A:B is designated as a ratio 1:X, then the reversible hydriding/dehydriding reaction can be written as

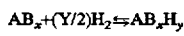

The above reversible reaction represents only a metastable equilibrium of the metal hydride in most cases. In most cases, true thermodynamic equilibrium favors a much less reversible disproportionation reaction which forms a stable A-hydride and free B atoms in an essentially irreversible reaction which can be represented by the equation:

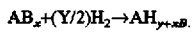

At room temperatures, the desirable reversible hydriding reaction predominates because the A and B metal atoms do not have enough mobility to diffuse enough to allow the disproportionation reaction to proceed.

However, at higher temperatures, particularly those greater than 150° C., most metal atoms can diffuse enough so that the undesirable disproportionation reaction can at least partially occur. The disproportionation reaction greatly reduces, or can even completely eliminate, the reversible hydriding reaction. The widespread phenomenon of disproportionation has largely prevented the practical application and development of "high temperature" heat pumping and storage by metal hydrides, where "high temperature" is herein defined as greater than 150° C.

Many alloys have been developed to take into account the tendency of a metal hydride alloy to break down or deteriorate. Certain applications require ultra-high temperature absorption, e.g., in excess of 700° C., and may utilize unalloyed elemental titanium as a hydrogen sorber. Elemental titanium has been found useful in temperature sensors in airplane engines. These sensors desorb hydrogen at temperatures over 700° C., such as when there is an engine fire, to indicate the dangerous condition to the pilots. By virtue of its unalloyed state, titanium cannot disproportionate and is useful for a great number of cycles.

On the other hand, most metal hydride alloys do tend to disproportionate when cycled through high temperatures. A goal in the industry has been the production of metal alloys which are less prone to disproportionation at room temperatures after they have been exposed to high temperatures. For example, addition of small amounts of additives to a binary alloy (e.g., Al to LaNi$_5$) produces a ternary alloy which has shown the capability of absorbing and desorbing hydrogen without causing critical disproportionation in the alloy. Such a process is described in an article by P. D. Goodell in the *Journal of Less Common Metals*, Vol. 99, 1984, p.1. These ternary alloys further provide other desirable characteristics, such as shifting the equilibrium pressures which may be necessary to customize a metal hydride alloy for a particular application.

Metal hydrides at elevated temperatures, from approximately 200° to 700° C., are especially susceptible to disproportionation because the disproportionation is often the thermodynamically preferred reaction over the reversible reaction and because of rapid metal atom diffusion. The search for metal hydride alloys that are capable of withstanding repeated cycles of charging and discharging, that is, of hydrogen absorption and desorption, over a large number of cycles is ongoing. The search is especially difficult for thermodynamically derived reasons for a metal hydride alloy or intermetallic compound which is capable of repeated cycling of from around room temperature, where hydrogen absorption begins to elevated temperatures (200° C.–700° C.) where hydrogen hydrogen absorption ends or the hydrogen is subsequently thermally desorbed.

The industry has recognized that a high temperature alloy capable of undergoing numerous charge/discharge cycles is necessary. For example, in the aforementioned Chapter 5 in the book entitled "Hydrogen in Intermetallic Compounds II", *Topics in Applied Physics*, 1992, Volume 67, the long term stability of intermetallics is described as uncertain, especially in high temperatures where disproportionation often occurs, p.208,234.

One feature of the invention disclosed herein is the discovery and optimization of particular alloys which have been customized for particular uses to provide good combinations of metal hydride alloy properties for use in high temperature heat storage, such as the inventive exhaust gas preheater described in aforementioned U.S. Pat. No. 5,450, 721. Other applications are known for what are herein termed high temperature alloys, that is, metal hydride alloys which are disproportionation resistant at elevated temperatures, including those applications set forth above. The applications include metal hydride air conditioning, heat engines, hydrogen compressors, temperature sensors, thermal actuators and heat upgrading applications.

SUMMARY OF THE INVENTION

In accordance with the requirements of the industry, there are disclosed herein high temperature metal hydride alloys and further a group of such alloys which are suitable for use as high temperature metal hydride heat exchangers at temperatures between 150° C. through approximately 600° C. Accordingly, there is disclosed a method for use of a disproportionation resistant, high temperature metal hydride alloy comprising the steps of providing an enclosed air-tight chamber having at least a first region; disposing a metal hydride alloy within said first region of said enclosed air-tight chamber, the alloy having the chemical formula $$A_{1-x}B_x$$

where

A is selected from the group of elements consisting of Ti, Hf, Y,

B is selected from the group of elements consisting of Nb, Ni, Co, and Fe, and x is in a range from 0.05 to approximately 0.80, said metal hydride alloy being disproportionation resistant after having attained a temperature exceeding 150° C.; introducing hydrogen gas at sufficient pressure into said first region of said enclosed air-tight chamber such that the metal hydride alloy is caused to absorb the hydrogen gas; increasing the temperature of said first region and of said metal hydride alloy to above at least 150° C., and essentially retaining the lattice structure of the alloy and maintaining the capability of the metal hydride alloy to absorb hydrogen after reducing the temperature of said first region and of said metal hydride alloy to below 150° C.

Also disclosed is a high disproportionation resistant metal hydride alloy for use in hydriding, the alloy comprising a binary intermetallic compound or solid solution alloy according to the formula $$A_{1-x}B_x$$

where

A is taken from the group of elements consisting of Ti, Hf, Y, and

B is taken from the group of elements consisting of Nb, Ni, Co, and Fe, and x is in a range from 0.05 to approximately 0.80 said metal hydride alloy being capable of resisting disproportionation at a temperature exceeding 150° C. Additive metals in small amounts, up to about 10 atomic percent, may be added to the metal hydride alloys of either the method or composition, as described below. In a preferred form, the method of use and generally as a high temperature, disproportion resistant alloy comprises $Ti_{1-x}Nb_x$ where x is in a range of from 0.05<x <0.60.

BRIEF DESCRIPTION OF THE DRAWINGS

FIG. 1 illustrates the isothermal hydrogen absorption-desorption curves over a range of pressures for a representative metal hydride alloy according to the present invention.

FIG. 2 is a graph of the dependency of plateau pressures for a representative metal hydride alloy made according to the present invention plotted to show dependence on the relative ratio of the constituent elements.

FIG. 3 illustrates the desorption isotherm curves of a representative metal hydride according to the present invention indicating the effect of temperature variation on the plateau pressures.

DETAILED DESCRIPTION OF THE PREFERRED EMBODIMENTS

Figure 4:
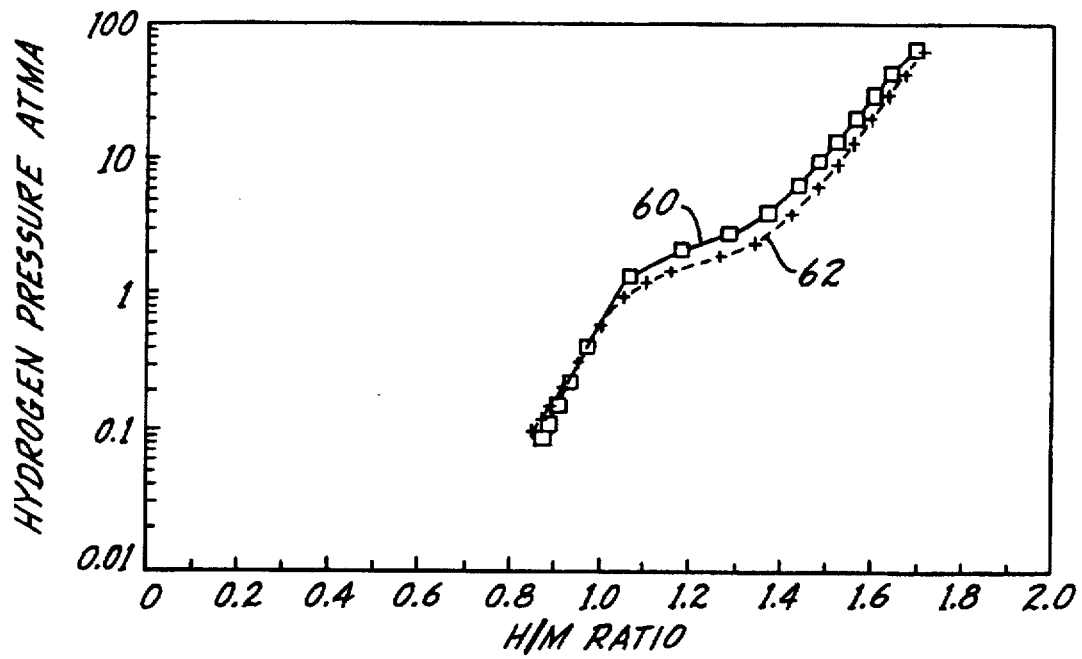
FIG. 4 illustrates the hydrogen desorption isotherm curves for a representative metal hydride alloy made according to this invention before and after high temperature aging indicating disproportionation resistant properties.

Certain alloy groups have been determined to be suitable for further testing and moreover suitable for providing a high temperature alloy for use in heat pumps, heat energy storage devices and other hydriding devices at temperatures greater than 150° C. through 600° C. These alloy groups or intermetallic compounds are binary, ternary and quaternary alloys and intermetallic compounds having generally a formula of AB, $A_2B$ or $A_{1-x}B_x$ where A is taken from a group consisting of titanium, hafnium, yttrium and B is taken from the group consisting of niobium, nickel, cobalt, and iron.

The ternary and quaternary alloys may include minor additions of various elements in minute quantities of about 1.0–2.0 atomic percent but additions may be as high as 10 atomic percent of the final alloy. Candidates for additions in the main binary alloys, for example $Ti_{1-x}Nb_x$, are aluminum, boron, cobalt, chromium, copper, hafnium, manganese, molybdenum, nickel, iron, gallium, germanium, silicon, tantalum, tin, vanadium and zirconium. As noted, one or more of these additives may be present to customize or otherwise change the characteristics (such as reduced hysteresis) of the binary alloy to provide for use in a particular application, with corresponding resulting tradeoffs. Many characteristics and conditions are presented in metal hydride alloys made in accordance with the formulas. One of the preferred binary solid solution alloys which has been found to produce consistent disproportionation resistant characteristics through accelerated disproportionation aging tests mimicking numerous cycles of absorption and desorption has been found to be $Ti_{1-x}Nb_x$.

The disproportionation resistant characteristics were confirmed by experimental testing which will be described below. Other candidates were also found to be good disproportionation resistant intermetallic compounds, such as hafnium-nickel (HfNi), hafnium cobalt (HfCo), hafnium-iron ($Hf_2Fe$), and yttrium-nickel (YNi).

In the aforementioned exhaust gas preheating U.S. Pat. No. 5,450,721, the desired application was for a metal hydride alloy that produces a desorption of about one atmosphere absolute at 400° C. Only the $Ti_{1-x}Nb_x$ system could easily provide the necessary metal hydride characteristics without disproportionation, and further testing of that alloy at different composition ranges was emphasized. It is those results of the $Ti_{1-x}Nb_x$ alloy which are discussed herein as the preferred candidate for a disproportionation resistant binary alloy capable of repeated cycles of hydrogen absorption-desorption at higher temperatures, e.g. 400° C. It is expected that other predicted candidates may operate for as long periods without failure. Those other candidates, and especially HfNi, HfCo, $Hf_2Fe$ and YNi, are considered to be within the scope of this invention. Further testing of the alloy candidates other than $Ti_{1-x}Nb_x$ may confirm the desirability and effectiveness of alternative alloy combinations or intermetallic compounds for specific applications, such as for high temperature uses. Sufficient preliminary testing has been conducted with regard to the listed alternative alloy combinations to determine suitability of these alternatives. Nevertheless, $Ti_{1-x}Nb_x$ is considered the preferred alloy combination, with or without the addition of additives for customized alloys.

While describing the testing of the solid solution alloy, it will be seen that the testing was conducted on different ratios of the titanium to that of the niobium. The tested range is from about 10 weight percent niobium, 70% titanium to 35 weight percent niobium, 65% titanium. The preferred ratio for testing and for general applications is Nb-30 atomic %, Ti-70 atomic %. The atomic percent ratios were varied from 0 atomic percent niobium to 40 atomic percent niobium for some of the testing.

As is disclosed in the aforementioned U.S. Pat. No. 5,450,721 it is possible to use elemental titanium in a reasonably pure form for the low pressure metal hydride. This is especially true for high temperature automobile engines, that is, engines such as diesels, the exhaust of which exceeds 700° C. in the course of normal use. It is necessary for high temperatures of approximately 700° C. to be attained when using pure titanium hydrogen desorption. Accordingly, the preferred range of x in the alloy formula for $Ti_{1-x}Nb_x$ is 0.05<x<0.40. The effects of different ratios and ranges for x with respect to hydrogen desorption will be discussed below.

It is considered that addition of minor additives of about 1–2 atomic percent, and even up to about 10 atomic percent, would not much change the basic disproportionation test data established for the binary alloy $Ti_{1-x}Nb_x$. Nevertheless, further testing of the ternary and quaternary alloys may be necessary for further determination of the characteristics and operating conditions of the alloys which include the additives. In U.S. Pat. No. 4,440,736, Maeland et al. describe a ternary alloy having titanium, niobium and a third metal as an additive to increase the rapidity of room temperature hydriding, but not to address the problem of disproportionation.

Testing has indicated that chromium, iron, hafnium, nickel, vanadium, zirconium and tantalum are desirable as additives to Ti-Nb for certain applications. The ternary alloys Ti-Nb-M, where M may comprise one or more additive of Cr, Fe, Hf, Mo, Ni, Ta, V and Zr have been considered for decreasing hysterisis for the hydrogen absorption and desorption curves relative to the same curves for the binary Ti-Nb alloy. Such additives may also be used to customize high temperature alloys and compounds to obtain desirable alloy properties, such as plateau pressure of a specific value. In the aforementioned U.S. Pat. No. 4,440, 736 to Maeland et al., additives over 1.0 atomic percent in a titanium-niobium system are described as beneficial for room temperature hydriding. The specific additives which are described herein are for addition to alloys which will be used in high temperature applications in which the alloy temperature will exceed 150° C., and in most cases will exceed 400° C.

To show the disproportionation resistant characteristics of the specific solid solution alloys and intermetallic compounds listed above, testing of both specific alloy types and the ranges of the relative ratios have been performed. Also performed are comparative testing of different alloys which are considered similar in most respects to the alloy groups disclosed above.

Disproportionation of the similar groups results at high temperatures, but unexpectedly does not result for the listed inventive alloy groups. The similarity of the disproportionation resistant alloys to those which do disproportionate, as well as the description found in certain heat of formation models, would lead some of the similar alloy groups to produce results similar to the inventive alloy groups. However, vastly different results in kind are achieved by use of the inventive alloy groups, which differences in results are unexpected from a theoretical viewpoint. It is only through extensive comparative testing that the alloy groups have been derived and determined to be disproportionation resistant. The testing bears out the invention as being suitable for use at high temperatures, and for use in many of the applications contemplated and described above and in the literature. Moreover, testing has led to determinations of change in characteristics which are derived from the inclusion of minute amounts of additives in the base alloy groups. It is on the basis of the testing, some of which is described below, that the inventors have been able to produce alloys and intermetallic compounds customized for specific uses and applications.

Referring now to FIG. 1, a plot is illustrated of the isotherm curves of a preferred metal hydride alloy, $Ti_{0.7}Nb_{0.3}$, each taken at an isothermal temperature of 450° C. The coordinate axis 12 represents the atomic ratio of hydrogen atoms to metal atoms and the ordinate axis 14 represents in logarithmic scale the hydrogen pressure in the enclosed testing chamber. Curve 16 is the absorption curve of the hydrogen absorption and indicates that as the hydrogen pressure in the enclosed testing chamber rises, more hydrogen is absorbed by the metal hydride alloy being tested. The curve 16 has the characteristic pressure plateau 18 in the central portion of the curve 16, including a plateau midpoint 20. The testing was terminated at the point 22, representing approximately 68 atmospheres hydrogen pressure.

The desorption curve 24 plots the hydrogen to metal atom ratio as the pressure in the testing chamber is decreased and the hydrogen is desorbed from the metal hydride alloy. As is evident from the desorption curve 24, a lower pressure is necessary for desorption of hydrogen at a specified H/M ratio than for the absorption at the same H/M ratio. The corresponding plateau 26 and plateau midpoint 28 of the desorption curve 24 are both lower than the corresponding elements of the absorption curve 16. This illustrates the hysteresis of the hydrogen absorption-desorption cycle which leads to some inefficiencies in the system.

Referring now to FIG. 2, the absorption-desorption curves for the midpoints of several different ratio mixtures of the preferred metal hydride alloy $Ti_{1-x}Nb_x$ is illustrated. The midpoints of the pressure plateaus, such as midpoints 20, 28 (FIG. 1), are plotted for the absorption curve 30 for several samples ranging from a niobium atomic content of 20% to 35%, each for an isothermal temperature of 450° C. A similar curve 32 is shown for the desorption, again indicating a significant hysteresis between the absorption and desorption curves 30,32.

The plateau pressure midpoints such as 20, 28 (FIG. 1) are important because the pressure plateaus 18,26 are characteristic of the hydriding alloys, and indicate at which pressures the majority of the hydrogen is absorbed. The plateau pressure is an important indicator of characteristics of a metal hydride alloy. The curves 30,32 (FIG. 2) show that it is possible to use niobium content as one variable by which the pressure properties of a metal hydride alloy may be used to customize the alloy for a particular application.

FIG. 3 illustrates in graph form the change in desorption curves for a particular alloy, in this case Ti 80 atomic %, Nb 20 atomic %, at three different temperatures. Desorption curve 40 is at 500° C., curve 44 at 450° C. and curve 48 at 400° C. The mid-plateau points 42, 46 and 50 of each respective desorption curve 40, 44 and 48 are at different pressures. The difference in plateau points may again be utilized in customizing the desired metal hydride alloys, for example, for a catalytic converter preheat application. For a heat pump in which the low pressure alloy is expected to reach 500° C., curve 40, it is expected that the pressure in the pump must be decreased to below 0.5 atmosphere to obtain a significant amount of hydrogen depletion. If the high pressure alloy at the other end of the heat pump cannot reduce the pressure to below 0.5 atmosphere it may then be necessary to customize the alloy, whether by increasing the niobium content or by adding small amounts of specific additives, such as Zr or Hf, which are known to lower the plateau pressure for the alloy.

FIG. 4 indicates the ability of the preferred metal hydride alloy of this invention to resist disproportionation even after the alloy has been subjected to high temperatures and pressures. The inventors have devised a process for testing for disproportionation which a metal hydride alloy undergoes when repeatedly used or used for long periods of time. The testing process, called accelerated disproportionation age ("DPA") is described in G. D. Sandrock, P. D. Goodell, E. L. Huston, P. M. Golben, "On the Disproportionation of Intermetallic Hydrides", *J. Phys. Chem.* NF, Vol. 164, 1989, at p.1285. The process subjects a metal hydride alloy to extremes in both temperature and pressure, so as to mimic and reproduce the changes in the metal hydride alloy which would occur over a lengthened period of repeated use. DPA is a quick and convenient method to evaluate the tendency for alloys to disproportionate.

DPA testing for the alloy is described, and essentially consisted of making a 10 gram sample of Ti 70 atomic percent and Nb 30 atomic percent. The titanium and niobium were melted together in a small argon arc furnace. The resultant alloy was hydrided by heating it to 800° C. in pressurized $H_2$ and allowing it to cool to room temperature. After hydride/dehydride cycling a few times, the alloy in the hydrided state was heated to 450° C. and an $H_2$ desorption isotherm determined. As shown in FIG. 4, the desorption isotherm shows the typical hydride plateau so important to hydride applications. The sample was then heated to 600° C. under a pressure of 68 atmospheres $H_2$ and held there for 12 hours.

Referring again to FIG. 4, the desorption curve 60 is the desorption isotherm at 450° C. of the alloy before the DPA and the curve 62 is the desorption isotherm at 450° C. of the same alloy after the DPA. As is evident from the curves, there is no significant change in the alloy's ability to absorb hydrogen, especially after having been subjected to such extreme conditions.

Figure 5:
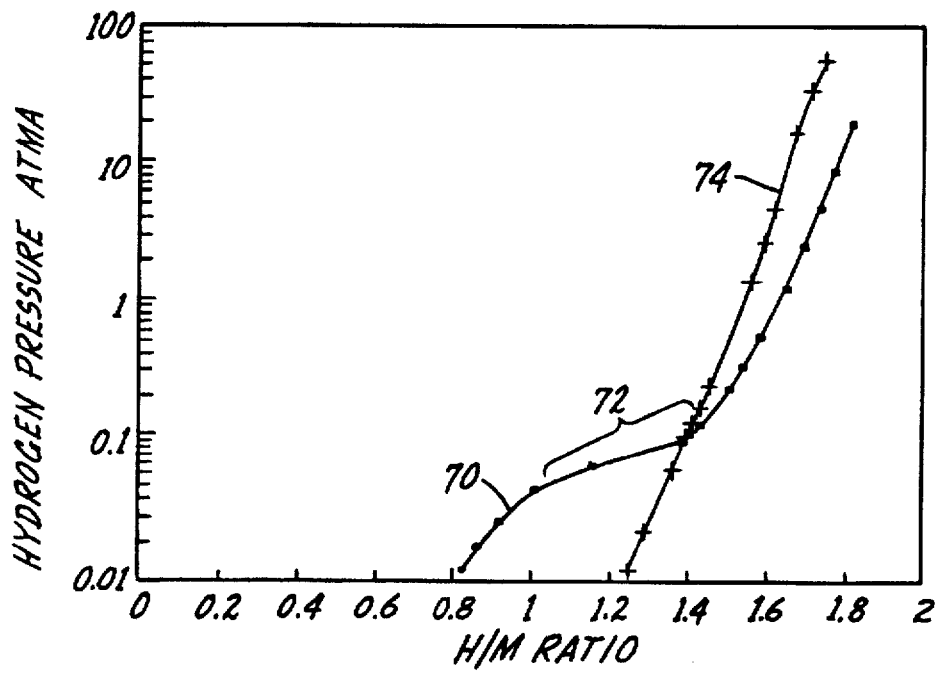
FIG. 5 illustrates the hydrogen desorption isotherm curves of a representative metal hydride alloy which has similar characteristics to the alloys according to the present invention, but shows the tendency to disproportionate at high temperatures after high temperature aging.

FIG. 5 illustrates the same curves for an alloy made by the exact same process, both in preparation of the alloy and in testing, before and after DPA. The metal hydride alloy tested was similar to the preferred alloy, in that it was 80 atomic percent titanium. However, instead of niobium, 20 atomic percent vanadium was used.

The curve 70 shows good hydriding capacity before the DPA, including a well defined plateau 72. However, after the same alloy was subjected to the DPA process, there is evident a marked change in the 450° C. isotherm curve 74. No plateau is evident and a much lesser amount of hydrogen is desorbed at the lower pressures. This is typically characteristic of an alloy which has been subjected to disproportionation and is no longer capable of practically or usefully absorbing or desorbing hydrogen.

Comparison of the changes in isotherm curves 60,70 before DPA and more especially the desorption curves 62,74 after the alloys have been subjected to DPA, shows the disproportionation resistance of the inventive alloy $Ti_{1-x}Nb_x$ and its greater ability to withstand high temperatures without deterioration of the ability to hydride an dehydride. The comparison also indicates that a very close combination of elements, $Ti_{1-x}V_x$, in the proportions tested which are similar to the inventive alloy, produce unexpected and vastly different results in terms of disproportionation. This is especially remarkable in that vanadium is in the same elemental family (Group VA), and also in that heat of formation approximations, made in accordance with the principles expounded upon by R. Griessen and T. Reisterer in Chapter 6, "Heat of Formation Models", found in *Topics in Applied Physics*, "Hydrogen in Intermetallic Compounds I", edited by L. Schlapbach, Springer-Verlag, Berlin, 1988, pp.219-284. Although the heat of formation modeling done by the inventors would appear to indicate that both $Ti_{1-x}Nb_x$ and $Ti_{1-x}V_x$ both would be similar in their disproportionation resistant characteristics, it is evident from the testing performed that the empirical mode (comparison FIGS. 4 and 5) indicates otherwise.

Figure 6:
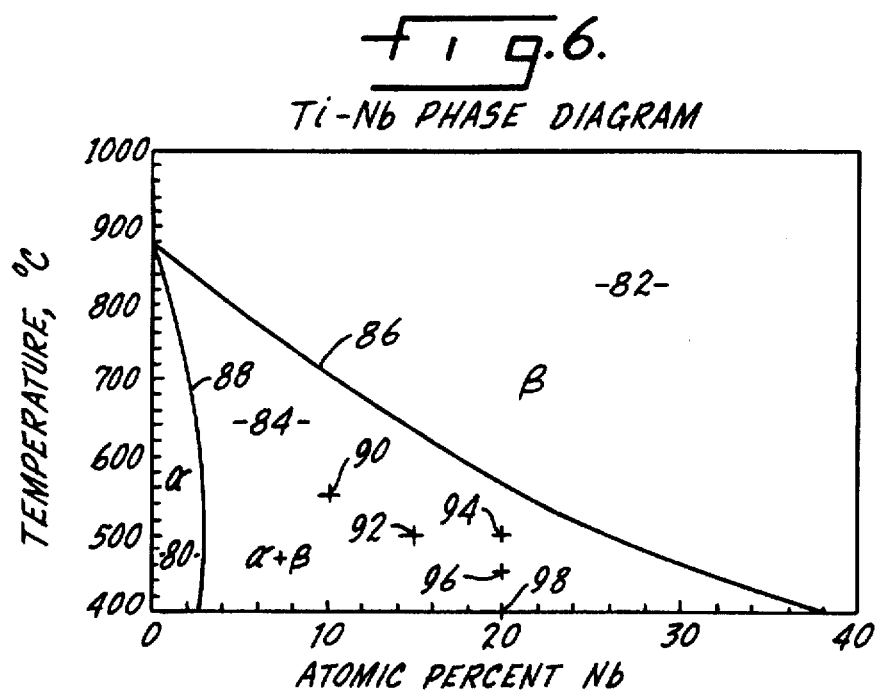
FIG. 6 indicates the phase diagram for different phases of a representative metal hydride alloy system made according to the present invention and the interdependence of relative ratio of constituent elements and the temperature on the phase and equilibrium characteristics of the alloy.

Referring now to FIG. 6, a possible explanation for the unexpected results of the titanium niobium compounds has been suggested. FIG. 6 is an illustration of a phase diagram for different ratio mixtures of the titanium niobium alloy as a function of the temperature.

It has been noted that the titanium-niobium alloys made according to one embodiment of this invention are basically stable at high temperature and pressure. However, at low enough temperatures the alloys can transform to Ti-rich alpha phase indicated at 80, and Nb-rich beta phase indicated at 82, which may result in undesirable disproportionation into two separate hydrides. A transitional alpha+beta phase mixture, indicated at 84, is separated from the beta phase 82 by a "solvus" line 86, and it is also separated from the alpha phase 80 by a second solvus line 88. The alpha+beta phase 84 is susceptible to disproportionation, because a separation of the titanium and niobium is already occurring in hydrogen free alloys as a result of natural crystallization processes. Above the solvus line 86, the titanium and niobium is in a state referred to as a solid solution, where mixing of the titanium and niobium is uniform. Below the solvus line 86, in the two-phase region 84, there is localized separation into Ti-rich and Ni-rich sub-regions. This localized separation is the initial stage of disproportionation but it is not an irreversible process; when the alloy is heated again to a point above the solvus line 86, the alloy once again returns to a solid solution alloy state.

The temperature at which this phase separation occurs essentially depends on Nb-content, with decreasing transformation temperature resulting from increasing Nb-content, as shown by the beta/beta+alpha phase boundary 86 of FIG. 6. It has been found that occasional cooling below the solvus line 86, even to room temperature, will not significantly disproportionate the alloy as long as there are significant periods that are spent above the transformation temperature.

The beta phase alloys of this invention are basically stable at high temperature and $H_2$ pressure. However, at low enough temperatures the alloys can metallurgically transform into Ti-rich alpha phase and Nb-rich beta phase, which may result in undesirable disproportionation into two separate hydrides. It is well known by those skilled in metallurgy that the temperature at which this phase transformation occurs depends on the Nb-content of the alloy, with decreasing transformation temperature resulting from increasing Nb-content, as shown by the beta/beta+alpha phase boundary 86 of FIG. 6.

The disproportionation of the alloy may be in large part avoided by selecting the niobium content atomic percent such that the transformation temperature, i.e. the solvus line 86, is below the temperature of most of the hydride operation. Thus, the alloy will generally remain in the single beta phase, and will return to that phase during repeated cycling, the alloy largely remains in the single beta phase temperature realm 82. An unexpected advantage of the Ti-Nb alloy system of this invention is that it is stable against disproportionation in the hydride state even at temperatures below that predicted for hydrogen free alloys, i.e., as might be predicted by FIG. 6.

Empirical evidence of alloy ratios which appear to be susceptible to disproportionation at specific temperatures have also shown unexpected results. Several points for specific alloy ratios have been tested by continuous operation at several specified temperatures. The following points are all in atomic percent:

90–90%Ti, 10%Nb, 550° C.
92–85%Ti, 15%Nb, 500° C.
94–80%Ti, 20%Nb, 500° C.
96–80%Ti, 20%Nb, 450° C.
98–80%Ti, 20%Nb, 400° C.

None of these alloys exhibited visible signs of disproportionation despite operation of the alloys below the apparent solvus line 86. It is considered that there is substantial effect of the presence of hydrogen in the alloy, which is believed to reduce the temperatures for the actual transition solvus line (not shown) significantly below the solvus line 86 shown in FIG. 6. It should be noted that the phase diagram of FIG. 6 is strictly speaking only applicable to the pure metal alloy comprising the base elements titanium and niobium, without the presence of hydrogen.

The ability of titanium niobium alloys to retain disproportionation resistant characteristics at high temperatures largely depends on two different considerations, both of which relate to the crystal structure of the titanium-niobium alloy. Disproportionation is generally not present in region 82, above the solvus line 86, because the heat energy is imparted to the metal atoms in the form of kinetic energy, which randomly distributes the atoms in the solid solution alloy into a body center cubic lattice structure, beta phase, that is homogeneous and uniform from one local region to the next. As the metal alloy cools, some of the atoms begin to "freeze" in place as they lose the kinetic energy necessary for diffusion and redistribution within the lattice structure. With further cooling, the majority of atoms become fixed in place in the crystal structure over the long term.

Whereas the preferred localized structure for most alloys, those subject to disproportionation, is one in which there are local concentrations of either one, two or more of the constituent atoms, it is considered that the preferred state of the titanium niobium alloys, as well as the other preferred alloys which are considered inventive in the preferred embodiments listed above, each "freeze" into a homogeneous solid solution alloy at a high enough temperature, i.e. above the solvus line 86, to prevent localized concentrations of atoms from setting up in the crystal lattice structure.

It should again be noted that for a titanium-niobium hydride, such as $Ti_{1-x}Nb_x H_y$, as opposed to the alloy, the solvus line 86 is well below that of the metallic alloy $Ti_{1-x}Nb_x$ shown in FIG. 6. Thus, disproportionation does not proceed upon cooling of the hydride, even after the hydride has achieved room temperature.

In contradistinction, other known alloys which are good hydrides at low temperatures, when the metal atoms are "frozen" in place, can become subject to disproportionation when heated to a high enough temperature. Although the known alloys do not disproportionate as long as the temperature is above the respective solvus line, upon reduction of the alloy to lower temperatures "freezes" the known alloys into a crystal lattice structure which has localized concentrations of one or another of the constituent atoms. This results in disproportionation, leading to a deterioration of the hydriding ability of the conventional alloys, for example, the titanium-vanadium desorption curve 74 shown in FIG. 5.

Figure 7:
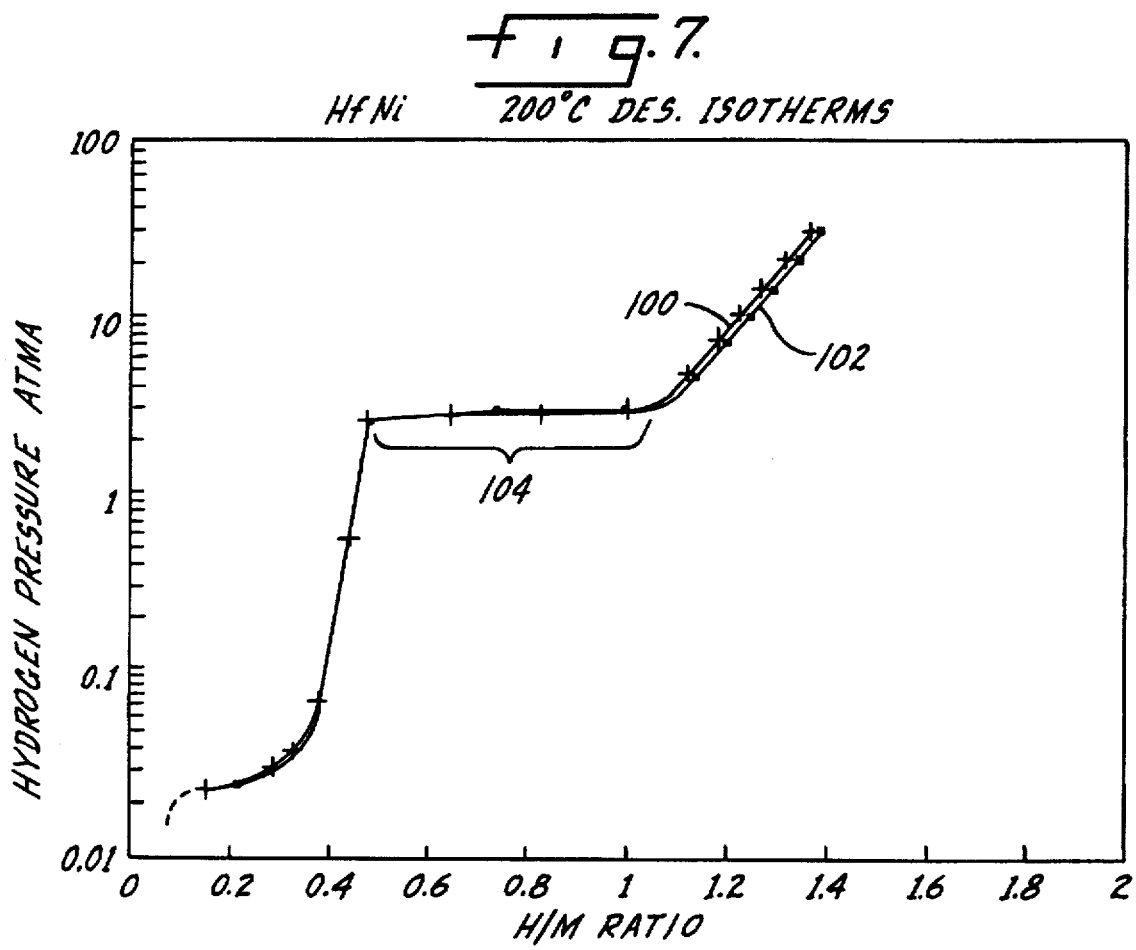
FIG. 7 illustrates the desorption isotherms for an alternative metal hydride according to the present invention before and after high temperature aging to indicate disproportionation resistance.

FIG. 7 illustrates the desorption isotherm of preferred disproportionation resistant intermetallic compound according to the present invention, that of hafnium-nickel. First, isothermal desorption curve measurements were performed at 200° C. on a freshly melted sample of hafnium-nickel (HfNi). The hafnium-nickel compound was then subjected to accelerated disproportion aging (DPA) of 34 atmospheres $H_2$ pressure and 600° C. for a period of 14 hours. After cooling again to 200° C., the desorption curve was again measured over the range of hydrogen pressures. As is evident from FIG. 7, the curve 102 after the DPA was almost identical to the curve 100 before the DPA. A good definition in the plateau region 104 indicates that the hafnium-nickel intermetallic compound would be an excellent disproportionation resistant candidate for temperatures up to 600° C.

The invention has been described in connection with several preferred embodiments of the invention. It will be understood that any modification may be made thereto while retaining the general scope of the invention. For example, it is contemplated that certain additives may be included in the alloys and compounds up to 10 atomic percent for various purposes, as described above. Further modifications of the inventive alloys and compounds may also be possible, such as a substitution of additives other than those listed above, which may be found to provide desirable alloy characteristics. Accordingly, the invention is only limited by the elements recited in the following claims and their equivalents.

What is claimed is:

1. An internal combustion engine powered vehicle system having an internal combustion engine and catalytic converter means for the reaction of pollutants contained in engine exhaust gas, said system including an arrangement for rapid pre-heating of said catalytic converter means during engine start-up when the engine is cold, said arrangement comprising:

a closed system of a low pressure metal hydride alloy heat exchanger containing a low pressure metal hydride composition and a high pressure metal hydride composition, said low pressure metal hydride composition consisting essentially of a binary intermetallic compound of one of the following general formulas:

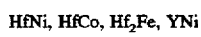

HfNi, HfCo, $Hf_2Fe$, YNi or of a solid solution alloy having the formula

$Ti_{1-x}Nb_x$ where x is in a range from 0.05 to approximately 0.80, said low pressure metal hydride composition being capable of resisting disproportionation at a temperature exceeding 150° C., said low pressure metal hydride composition providing the heat necessary for catalytic reaction of exhaust pollutants upon occlusion of hydrogen during an engine start-up period when said engine is cold, and means for effecting hydrogen flow upon engine start-up from the high pressure metal hydride alloy to the low pressure metal hydride composition and hydrogen flow from the low pressure metal hydride composition to the high pressure metal hydride alloy following said start-up period and after engine exhaust gases have attained a normal elevated operating temperature.

2. The internal combustion engine powered vehicle system according to claim 1, wherein the low pressure metal hydride composition includes additives from about 1.0 atomic percent to about 10.0 atomic percent, resulting in the additives consisting ternary or quaternary metal hydride alloys according to the general formula $Ti_{1-x}Nb_{x-z}M_z$ or $Ti_{1-x}Nb_{x-z}M_zR_y$ where M and R comprise one or more of the additive metals selected from the group consisting of Aluminum, Boron, Cobalt, Chromium, Copper, Mafnium, Manganese, Molybdenum, Nickel, Iron, Gallium, Germannum, Silicon, Tin, Tantalum, Vanadium, and Zirconium, and where $z<0.10$ or $z+y<0.10$.

3. The internal combustion engine powered vehicle system according to claim 1, wherein said low pressure metal hydride composition consists essentially of a solid solution alloy of titanium and niobium according to the following formula:

$Ti_{1-x}Nb_x$ where x is in a range from 0.05 to approximately 0.40.

4. The internal combustion engine powered vehicle system according to claim 1, wherein the intermetallic compound consists essentially of Hafnium Nickel, HfNi.

5. The internal combustion engine powered vehicle system according to claim 1 wherein said means for effecting hydrogen flow comprises a valve.

* * * * *